(12) United States Patent  
Huang

(10) Patent No.: US 9,125,248 B2  
(45) Date of Patent: Sep. 1, 2015

(54) INTELLIGENT LED DRIVE POWER

(71) Applicant: Xiamen Xing HengLong Lighting Technology Co.,Ltd., Xiamen, Fujian (CN)

(72) Inventor: Huaqing Huang, Xiamen (CN)

(73) Assignee: XIAMEN XING HENGLONG LIGHTING TECHNOLOGY CO., LTD., Xiamen (CN)

( * ) Notice: Subject to any disclaimer, the term of this patent is extended or adjusted under 35 U.S.C. 154(b) by 478 days.

(21) Appl. No.: 13/678,049

(22) Filed: Nov. 15, 2012

(65) Prior Publication Data

US 2013/0234594 A1 Sep. 12, 2013

(30) Foreign Application Priority Data

Mar. 8, 2012 (CN) .......................... 2012 2 0084494

(51) Int. Cl.
*H01J 1/52* (2006.01)
*H01J 5/02* (2006.01)
*H05B 37/02* (2006.01)
*H05B 33/08* (2006.01)

(52) U.S. Cl.
CPC ............ *H05B 37/02* (2013.01); *H05B 33/0887* (2013.01); *H05B 37/0245* (2013.01); *Y02B 20/341* (2013.01); *Y02B 20/48* (2013.01)

(58) Field of Classification Search
CPC ....... H02J 9/061; H02J 7/0004; H02J 7/0008; H02J 7/0068; H02J 7/0042; H02J 7/022; H02J 9/062; H02J 13/0044; H02J 13/0048; H02J 2001/004; H02J 2009/067; H02J 4/00; H02J 7/0014; H02J 7/1423
See application file for complete search history.

(56) References Cited

U.S. PATENT DOCUMENTS

| 2008/0002102 A1* | 1/2008 | Lee ................................ 349/68 |
| 2009/0135629 A1* | 5/2009 | Mancebo del Castillo Pagola ............................ 363/34 |
| 2011/0096574 A1* | 4/2011 | Huang ....................... 363/21.18 |
| 2011/0109164 A1* | 5/2011 | Mohammed Suhura et al. ............................... 307/66 |
| 2011/0181196 A1* | 7/2011 | Kang et al. .................... 315/246 |

* cited by examiner

*Primary Examiner* — Douglas W Owens
*Assistant Examiner* — Monica C King
(74) *Attorney, Agent, or Firm* — Rabin & Berdo, P.C.

(57) ABSTRACT

An intelligent LED drive power has an EMI filter, two AC/DC constant current units, a microcontroller, a switch unit, two state detect circuits and an assistant power. The input and output of the constant current units are alternatively connected to the output of the EMI filter and the LED light source through the switch unit. The inputs of each state detect circuits are separately connected to the output of one of the constant current units. The outputs of each state detect circuit are separately connected to the microcontroller input; the microcontroller output is connected to the switch unit input; the assistant power input is connected to the EMI filter output. The assistant power output is connected to the microcontroller. The switch controls the two AC/DC constant current units by detecting the mains supply input voltage and the AC/DC constant current unit output voltage and current.

11 Claims, 4 Drawing Sheets

INTELLIGENT LED DRIVE POWER

FIELD OF THE INVENTION

The present invention relates to an LED drive power, especially to an intelligent LED drive power with maintenance-free, long life-time and energy saving.

BACKGROUND OF THE INVENTION

Nowadays, the LED and OLED light source of quickly developing has advantages of long life, high energy saving and flexibly light adjusting. Although the life of the LED light source reaches to 100000 hours, there is not a high reliable lamp of 100000 hours. The existing LED lamp is of 3 to 5 years quality protection, because the life of the LED drive power corresponding to the LED light source can not reach the requirement. The existing fully developed and high quality of the LED drive power is provided with 3 years' quality assurance, fewer with 5 years' quality assurance. The life of the drive power is between 300000 to 500000 hours. The life of the drive power determines the life of the LED lamp. For a high reliable and long life LED lamp, the life of the LED light source is 100000 hours, but the life of the coupled drive power is only 500000 hours. It greatly reduces the utilization of the LED and rarely meets the requirement of the high reliable lamp of 100000 hours. If these lamps are end-of-life treated in advance by the user or the manufacturer, it leads to a high wasting of the LED and lamp housing and other durable resource. If these lamps are repaired, it takes a lot of manpower and material cost. Especially for lamps installed high or in certain places, it takes high maintenance cost, even that the maintenance cost will be higher that the overall cost of the lamp. These maintenance cost makes the energy saving effect greatly reduced.

The common structure of an LED drive power includes an EMI filter and an AC/DC constant current unit. the AC/DC constant current unit is consist of full-wave rectification unit, PFC power factor correction unit, DC/DC power unit controlled by PWM, secondary rectification filtering unit, constant current limited voltage control unit and feedback control loop unit. in these units, except that the EMI filter is passive and reliable without failure, other units are easily broken down. As there are many elements in the system and the circuits are interrelated, if an element is broken down, others will be broken down even several units. The diagnosis and maintenance of the failure are difficult.

These failures can be generally summed up as internal element with break or short, but the results to the output are the same: none output voltage or current. So that it can be determined that whether it is broken down or not from combining the input voltage of the mains supply and the output voltage and the current of the LED drive power. If the input voltage of the mains voltage is normal, so as the output voltage and current of the LED drive power, the LED drive power is normal working; if the mains supply is normal and the voltage and current of the LED drive power are not, it can be determined that the LED drive power is broken down.

SUMMARY OF THE INVENTION

The object of the present invention is to overcome the problems of the existing technology and provide with an intelligent LED drive power, which is of maintenance-free, long life-time and energy saving.

The technical proposal of the present invention to solve the above technical problems is as below:

An intelligent LED drive power, includes an EMI filter of which the input is connected to the AC mains supply and an AC/DC constant current unit of which the output is connected to the LED light source; the present invention includes two AC/DC constant current units, a microcontroller, a switch unit, two state detect circuits and an assistant power; the input and output of the two AC/DC constant current unit is alternatively connected to the output of the EMI filter and the LED light source through the switch unit; the inputs of each state detect circuits are separately connected to the output of one of the AC/DC constant current unit, the outputs of each state detect circuit are separately connected to the input of the microcontroller; the output of the microcontroller is connected to the input of the switch unit; the input of the assistant power is connected to the output of the EMI filter, the output of the assistant power is connected to the microcontroller.

The switch unit includes a relay drive circuit, a first relay and a second relay, the output of the microcontroller is connected to the input of the relay drive circuit, the outputs of the relay drive circuit are separately connected to the inputs of the coil of the first relay and the second relay; the inputs of the two AC/DC constant current unit are connected to the output of the EMI filter through the first relay; the outputs of the two AC/DC constant current unit are connected to the LED light source through the second relay.

The first relay and the second relay are DPDT relay, the two movable contacts of the first relay are separately connected to the positive output and negative output of the EMI filter, in the four rest contacts of the first relay, two rest contacts corresponding to one of the movable contact are separately connected to the positive inputs of the two AC/DC constant current units, the other two rest contacts corresponding to the other movable contact are separately connected to the negative inputs of the two AC/DC constant current units; the two movable contacts of the second relay are separately connected to the positive and negative charges of the LED light source, in the four rest contacts of the second relay, two rest contacts corresponding to one of the movable contact are separately connected to the positive outputs of the two AC/DC constant current units, the other two rest contacts corresponding to the other movable contact are separately connected to the negative outputs of the two AC/DC constant current units.

The first relay includes two first SPST relays, the second relay includes two second SPST relays; the movable contacts of the two first SPST relays are separately connected to the positive and negative outputs of the EMI filter, each of one of the rest contact of the two first SPST relays are separately connected to the positive input of the two AC/DC constant current units, and each of the other of the rest contact of the two first SPST relays are separately connected to the negative input of the two AC/DC constant current units; the movable contacts of the two second SPST relays are separately connected to the positive and negative charges of the LED light source, each of one of the rest contact of the two second SPST relays are separately connected to the positive output of the two AC/DC constant current units, and each of the other of the rest contact of the two second SPST relays are separately connected to the negative output of the two AC/DC constant current units.

The microcontroller is disposed with a communication interface to connect to the central control computer.

The AC/DC constant current unit includes a full-wave rectification unit, a PFC topology unit and an FLYBACK topology unit of in order connected.

The AC/DC constant current unit includes a full-wave rectification unit, a PFC topology unit and an LLC topology unit of in order connected.

The AC/DC constant current unit includes a full-wave rectification unit, a capacity and a single stage PFC topology unit of in order connected.

The intelligent LED drive power of the present invention is provided with an intelligent control unit consist of a microcontroller, a switch unit, an assistant power and two state detect circuits. The intelligent control unit controls one of the AC/DC constant current unit situated in work state, while the other in the backup state and real-time detects the state of the mains supply and the AC/DC constant current unit in working state. If the voltage of the mains supply is normal and the output voltage and current of the AC/DC constant current unit are abnormal, that is to say, the AC/DC constant current unit is broken down or the life is draining away, the switch is actuated, making the other AC/DC constant current unit work. In actual production, with reasonable circuit design and thermal design, it can be ensured that the life of each AC/DC constant current unit can reach to 500000 hours. And when one of the AC/DC constant current units is broken down or the life is draining away, the other AC/DC constant current unit alternatively works, making sure that the life of the whole LED drive power can reach to 100000 hours, which is coupled to the life of the LED light source.

In the intelligent LED drive power of the present invention, the light adjusting signal control input, receives the light adjusting control signal, which is then converted by the microcontroller to control the corresponding light adjusting circuit to light adjust. The communication interface of the microcontroller can telecommunicate with the central control computer through the common network interface such as RS485 or CAN bus interface, making the telecommunicated LED drive power with new functions, such as remote control switch, remote light adjusting control or feeding back the failure of the LED drive power to the central control system and so on. Compared to the existing LED drive power, the advantages of the present invention are as below:

1. as with the two AC/DC constant current units and the intelligent control unit consist of the microcontroller, the switch unit, the assistant power and two state detect circuits to switch control the two AC/DC constant current units, it is ensured that the life of the LED drive power is coupled to that of the LED light source. It's of maintenance-free, long lifetime and energy saving.

2. As the internal of the AC/DC constant current units presents to be an integral whole, it's just needed to detect the voltage of the mains supply and the voltage and current signal of the output, and the failure and the serious degree in the internal of the whole AC/DC constant current units can be ignored. So that the circuit structure of the present invention is simple and easy.

3. as the switch unit is applied with a relay drive circuit consist of a first relay and a second relay, it's simple structural, easy operated and assembled.

4. as the microcontroller is powered by a high reliable assistant power and the assistant power is independent and separated from the two AC/DC constant current units, the microcontroller will not be influenced even when the AC/DC constant current units are broken down.

5. it's added with light adjusting function, the light is automatically adjusted on time according to the actual requirement by the microcontroller, the light adjusting effect is well. it can be achieved effective illumination of the LED light source by light adjusting with energy-saving.

6. as with the communication interface of the microcontroller, the communication interface of the microcontroller can telecommunicate with the central control computer through the common network interface such as RS485 or CAN bus interface, making the telecommunicated LED drive power with new functions, such as remote control switch, remote light adjusting control or feeding back the failure of the LED drive power to the central control system and so on.

The present invention will be further described with the drawings and embodiments, but it is apparent to those skilled in the art that a variety of modifications and changes may be made without departing from the scope of the present invention.

DETAILED DESCRIPTION OF THE EMBODIMENT

The First Embodiment

Figure 1:
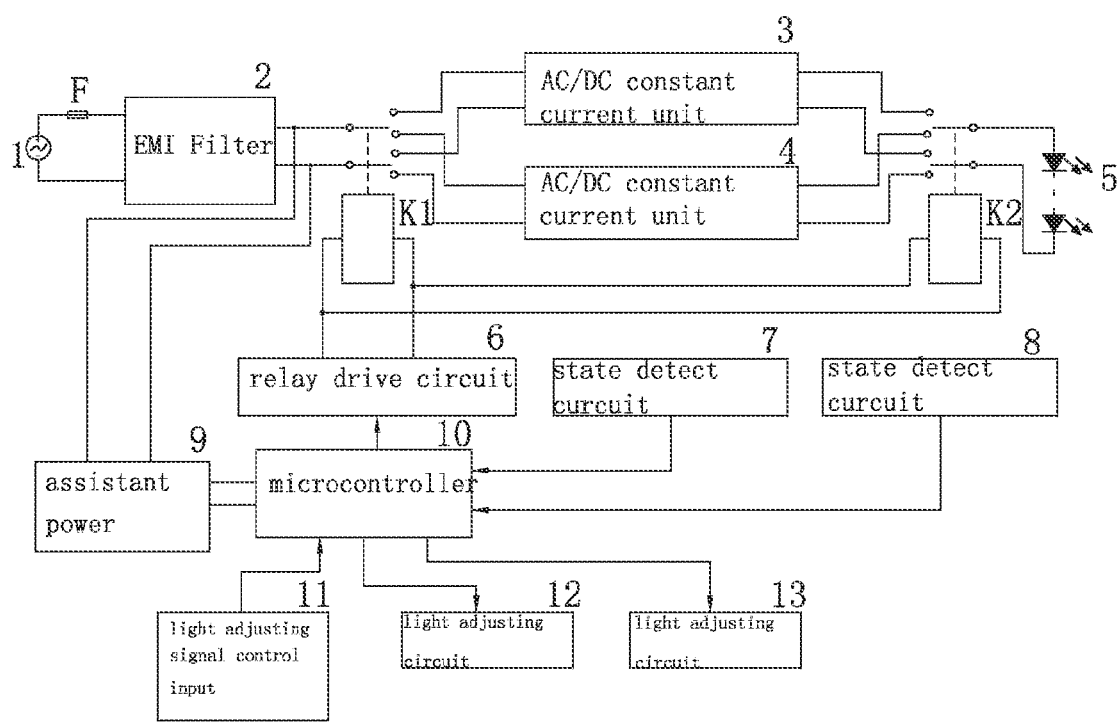
FIG. 1 illustrates the functional block diagram of the first embodiment of the present invention.

Refer to the FIG. 1. The intelligent LED drive power of the present invention includes an EMI filter 2, two AC/DC constant current unit 3, 4, a microcontroller 10, a switch control unit, two state detect circuits 7, 8 and an assistant power 9, thereinto, the positive input of the EMI filter 2 is connected to the positive charge of the mains supply 1 by the fuse F, the negative input of the EMI filter 2 is connected to the negative charge of the mains supply 1, the outputs of the two AC/DC constant current unit 3, 4 are separately connected to the LED light sources 5; the microcontroller 10 is used to processing the signal input and then outputs a control signal, the switch unit is used to switch control the two AC/DC constant current unit 3, 4. The state detect circuits 7, 8 are used to state detect the two AC/DC constant current unit 3, 4. In detailed, the inputs and outputs of the two AC/DC constant current units 3, 4 are connected to the outputs of the EMI filter 2 and the LED light sources 5 through the switch unit. The inputs of each state detect circuit are separately connected to the outputs of one of the AC/DC constant current unit (not figured), the outputs of each state detect circuit are separately connected to the inputs of the microcontroller 10; the output of the microcontroller 10 is connected to the input of the switch unit. The input of the assistant power 9 is connected to the output of the EMI filter 2, the output of the assistant power 9 is connected to the microcontroller 10. In the present invention, when the microcontroller 10 is powered by the assistant power 9, it is determined that whether the mains supply is normal by the assistant power 9. That is to say, if the microcontroller 10 is normal, the mains supply is normal; otherwise the main supply is abnormal. As the assistant power 9 is independent and separated from the two AC/DC constant current units 3, 4, the microcontroller will 10 not be influenced even when the AC/DC constant current units are broken down.

As a preferred embodiment, the switch unit includes a relay drive circuit 6, a first relay K1 and a second relay K2, the output of the microcontroller 10 is connected to the input of the relay drive circuit 6, the outputs of the relay drive circuit 6 are separately connected to the input of the two coils of the first relay K1 and the second relay K2; the inputs of the two AC/DC constant current units 3, 4 are alternatively connected to the output of the EMI filter 2 by the first relay K1, the outputs of the two AC/DC constant current units 3, 4 are alternatively connected to the LED light sources 5 by the second relay K2. The first relay K1 and the second relay K2 are DPDT relays. The two movable contacts of the first relay K1 are separately connected to the positive output and negative output of the EMI filter 2, in the four rest contacts of the first relay K1, two rest contacts corresponding to one of the movable contact are separately connected to the positive inputs of the two AC/DC constant current units 3, 4, the other two rest contacts corresponding to the other movable contact are separately connected to the negative inputs of the two AC/DC constant current units 3, 4; the two movable contacts of the second relay K2 are separately connected to the positive and negative charges of the LED light source 5, in the four rest contacts of the second relay K2, two rest contacts corresponding to one of the movable contact are separately connected to the positive outputs of the two AC/DC constant current units 3, 4, the other two rest contacts corresponding to the other movable contact are separately connected to the negative outputs of the two AC/DC constant current units 3, 4.

As a preferred embodiment, the present invention is further disposed with two light adjusting circuit 12, 13 and a light adjusting control signal input 11, the light adjusting control signal input 11 is connected to the input of the microcontroller 10, the output of the microcontroller 10 is connected to the inputs of the two light adjusting circuit 12, 13, the output of the light adjusting circuit 12 is connected to the AC/DC constant current unit 3, the output of the light adjusting circuit 13 is connected to the AC/DC constant current unit 4 (not figured). The light adjusting control signal input 11 receives the light adjusting control signal and inputs the signal to the microcontroller 10 to be conversed to control the corresponding light adjusting circuit to light adjust. During the actual proceeding, it can be applied with remote light adjusting control to input light adjusting control signal to the light adjusting control signal input 11, with light adjusting knob to light adjust or with a light adjuster of 0-10V to light adjust. The light adjusting effect is better and the output current can be realized with stepless within the range of 0-100% when applied with a light adjuster.

As another preferred embodiment, as with the communication interface of the microcontroller 10, the communication interface of the microcontroller can telecommunicate with the central control computer through the common network interface such as RS485 or CAN bus interface, making the telecommunicated LED drive power with new functions, such as remote control switch, remote light adjusting control or feeding back the failure of the LED drive power to the central control system and so on.

When worked, the first relay K1 and the second relay K2 are acted in the same time, making the input and output of the AC/DC constant current unit 3 separately connected to the EMI filter 2 and the LED light source 5, and the input and output of the AC/DC constant current unit 4 cut off with the EMI filter 2 and the LED light source 5. now the AC/DC constant current unit 3 is situated in the work state while the AC/DC constant current unit 4 in the backup state.

Meanwhile, the state detect circuit 7 real-time detects the state of the AC/DC constant current unit 3 in work state. During the work, if the state detect circuit 7 detects that the output voltage and current of the AC/DC constant current unit 3 are normal, and the input voltage of the mains supply is normal as well, the LED drive power is normal; if the state detect circuit 7 detects that the output voltage and current of the AC/DC constant current unit 3 are not within the normal range, the detect result will be submitted to the microcontroller 10 to process. If the input voltage of the mains supply is normal, it comes out that the AC/DC constant current unit 3 is broken down or end of life, so the microcontroller 10 will control the relay drive circuit 6 to drive the first relay K1 and the second relay K2 to act in the same time for the switch of the two AC/DC constant current units 3, 4, making the AC/DC constant current unit 4 in backup state work. The state detect circuit 8 is actuated to real-time detect the AC/DC constant current unit 4. if the state detect circuit 7 detects that the output voltage and current of the AC/DC constant current unit 3 are not within the normal range, and the input voltage of the mains supply is abnormal either, the microcontroller 3 will not submit control signal to the relay drive circuit 6. The AC/DC constant current unit 3 in work state will not be detected until the input mains supply returns to normal to determine the failure or end-of-life of the AC/DC constant current unit 3 and the alternative of the AC/DC constant current unit 4.

In actual producing, with reasonable circuit and thermal design, the life of each AC/DC constant current unit reaches to 500000 hours, when one of the AC/DC constant current unit is broken down or end of life, the other AC/DC constant current unit will be alternatively work, making sure that the life of the integral LED drive power can reach to 100000 hours to couple to the life of the LED light source. Obviously, the present invention is applied with a double AC/DC constant current units 3, 4, which are intelligently switch controlled, to prevent from maintenance and end-of-life of the single AC/DC constant current unit due to broken. The maintenance costs much and the material is of waste.

The Second Embodiment

Figure 2:
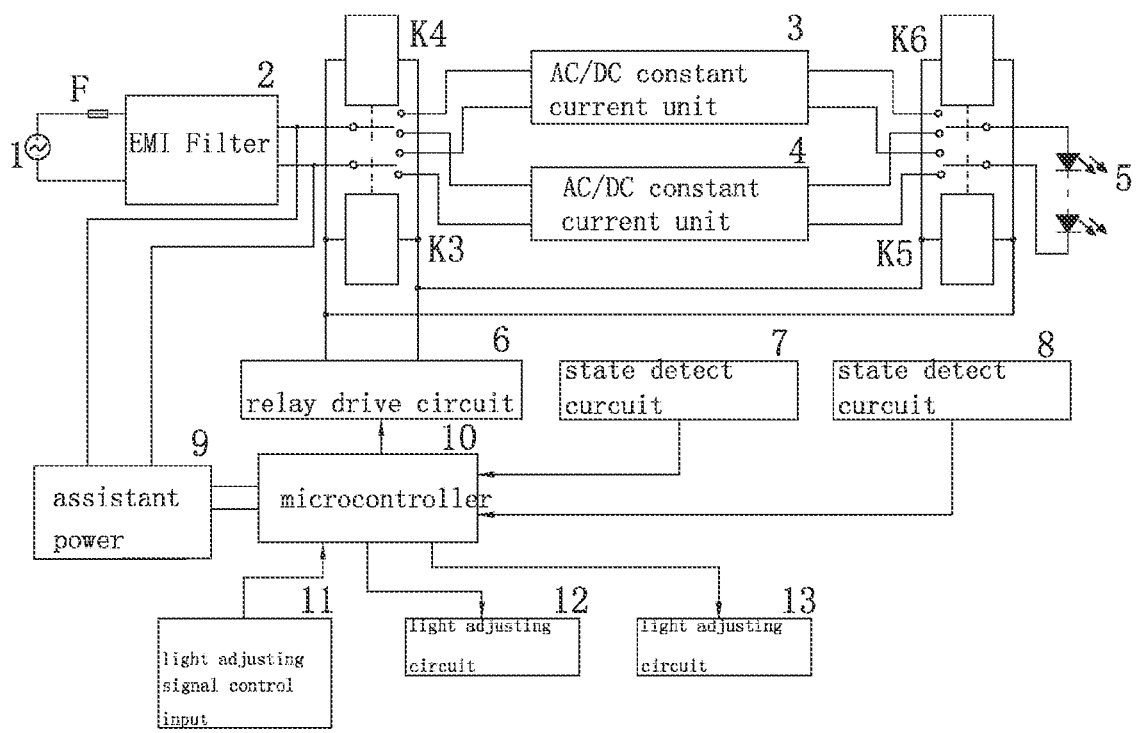
FIG. 2 illustrates the functional block diagram of the second embodiment of the present invention.

Refer to the FIG. 2. the difference from the first embodiment is as below: the first relay includes two first SPST relays K3, K4, the second relay includes two second SPST relays K5, K6, the inputs of the two coils of the two first SPST relays K3, K4 and the two second SPST relays K5, K6 are separately connected to the outputs of the relay drive circuit 6. In detailed, the movable contacts of the two first SPST relays K3, K4 are separately connected to the positive and negative outputs of the EMI filter 2, one rest contact of each of the two first SPST relays K3, K4 are separately connected to the positive inputs of the two AC/DC constant current units, the other contact of each of the two first SPST relays K3, K4 are separately connected to the negative inputs of the two AC/DC constant current units. The movable contacts of the two second SPST relays K5, K6 are separately connected to the positive and negative charges of the LED light sources 5, one rest contact of each of the two second SPST relays K5, K6 are separately connected to the positive outputs of the two AC/DC constant current units, the other contact of each of the two second SPST relays K5, K6 are separately connected to the negative outputs of the two AC/DC constant current units.

Figure 4:
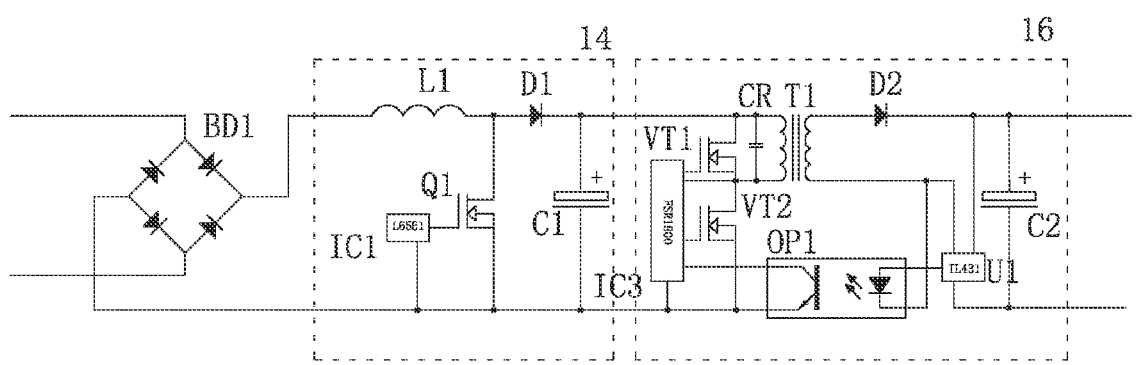
FIG. 4 illustrates the structure of the AC/DC constant current units with PFC topology unit and LLC topology unit.
Figure 5:
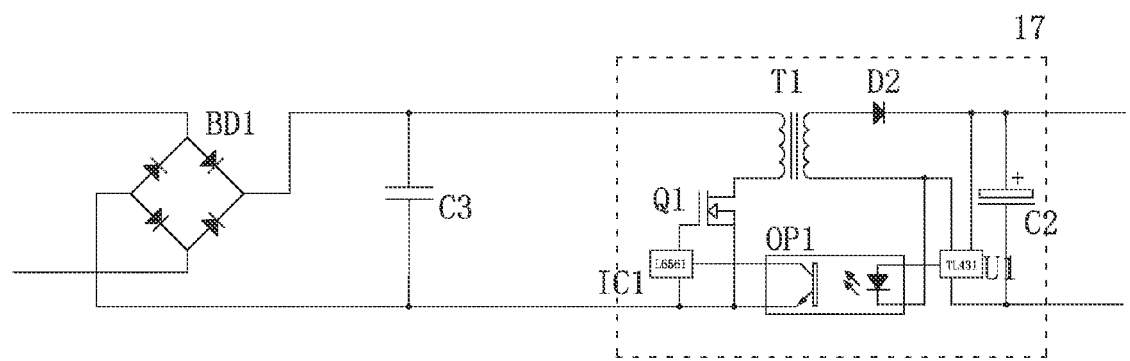
FIG. 5 illustrates the structure of the AC/DC constant current units with single state PFC topology unit.

The same as the first embodiment, the relay drive circuit 6 controls the two first SPST relays K3, K4 and the two second SPST relays K5, K6 to act at the same time, achieving the switch control to the two AC/DC constant current units. The two first SPST relays K3, K4, the two second SPST relays K5, K6 and the first relay K1, the second relay K2 in the first embodiment can be electromagnet relays or solid relays. In the intelligent LED drive power of the present invention, the structure of the two AC/DC constant current units 3, 4 can be common, consist of full-wave rectification unit, PFC power factor correction unit, DC/DC power unit controlled by PWM, secondary rectification filtering unit, constant current limited voltage control unit and feedback control loop unit. The structure of the two AC/DC constant current units can be applied as figured in the FIG. 3 to FIG. 5.

Figure 3:
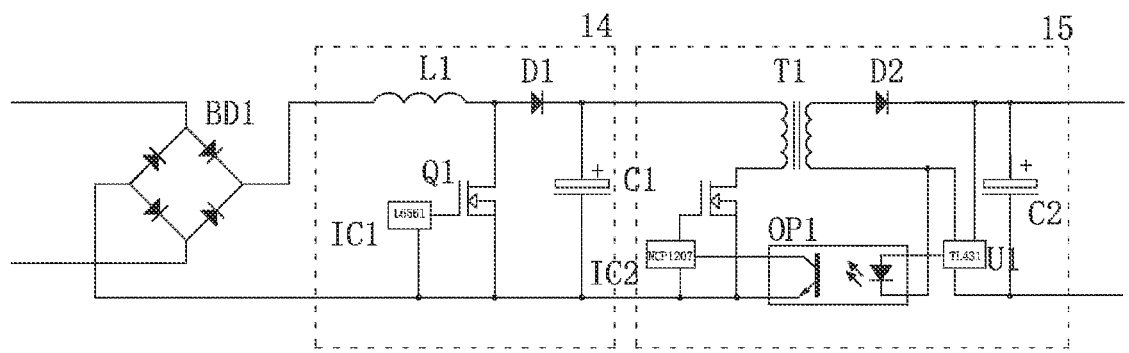
FIG. 3 illustrates the structure of the AC/DC constant current units with PFC topology unit and FLYBACK topology unit.

In the FIG. 3, the AC/DC constant current includes a full-wave rectification unit BD1, a PFC topology unit 14 and a FLYBACK topology unit 15 in order connected. The proceeding stage is applied with PFC topology unit 14 for active power factor correction; the secondary stage of PWM circuit is applied with FLYBACK topology unit 15 for constant current buck conversion to drive the LED light sources. In the FIG. 4, the AC/DC constant current includes a full-wave rectification unit BD1, a PFC topology unit 14 and a LLC topology unit 16 in order connected. The structure has higher power level and well conversion efficiency. In the power level of 100 W to 300 W, the structure can acquire much better technical and economic performance. In the FIG. 5, the AC/DC constant current includes a full-wave rectification unit BD1, a capacity C3 and a single stage PFC topology unit 17 in order connected. In the application of power level within 60 W, the structure is applied with single stage PFC topology, which satisfies the high power factor in the lighting and the low harmonic current with smaller size and lower cost. It reduces the circuit elements, making the reliability of the integral power improved.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

What is claimed is:

1. An intelligent LED drive power, includes an EMI filter of which the input is connected to the AC mains supply and an AC/DC constant current unit of which the output is connected to the LED light source; wherein includes two AC/DC constant current units, a microcontroller, a switch unit, two state detect circuits and an assistant power; the input and output of the two AC/DC constant current unit is alternatively connected to the output of the EMI filter and the LED light source through the switch unit; the inputs of each state detect circuits are separately connected to the output of one of the AC/DC constant current unit, the outputs of each state detect circuit are separately connected to the input of the microcontroller; the output of the microcontroller is connected to the input of the switch unit; the input of the assistant power is connected to the output of the EMI filter, the output of the assistant power is connected to the microcontroller.

2. An intelligent LED drive power according to the claim 1, wherein the switch unit includes a relay drive circuit, a first relay and a second relay, the output of the microcontroller is connected to the input of the relay drive circuit, the outputs of the relay drive circuit are separately connected to the inputs of the coil of the first relay and the second relay; the inputs of the two AC/DC constant current unit are connected to the output of the EMI filter through the first relay; the outputs of the two AC/DC constant current unit are connected to the LED light source through the second relay.

3. An intelligent LED drive power according to the claim 2, wherein the first relay and the second relay are DPDT relay, the two movable contacts of the first relay are separately connected to the positive output and negative output of the EMI filter, in the four rest contacts of the first relay, two rest contacts corresponding to one of the movable contact are separately connected to the positive inputs of the two AC/DC constant current units, the other two rest contacts corresponding to the other movable contact are separately connected to the negative inputs of the two AC/DC constant current units; the two movable contacts of the second relay are separately connected to the positive and negative charges of the LED light source, in the four rest contacts of the second relay, two rest contacts corresponding to one of the movable contact are separately connected to the positive outputs of the two AC/DC constant current units, the other two rest contacts corresponding to the other movable contact are separately connected to the negative outputs of the two AC/DC constant current units.

4. An intelligent LED drive power according to the claim 2, wherein the first relay includes two first SPST relays, the second relay includes two second SPST relays; the movable contacts of the two first SPST relays are separately connected to the positive and negative outputs of the EMI filter, each of one of the rest contact of the two first SPST relays are separately connected to the positive input of the two AC/DC constant current units, and each of the other of the rest contact of the two first SPST relays are separately connected to the negative input of the two AC/DC constant current units; the movable contacts of the two second SPST relays are separately connected to the positive and negative charges of the LED light source, each of one of the rest contact of the two second SPST relays are separately connected to the positive output of the two AC/DC constant current units, and each of the other of the rest contact of the two second SPST relays are separately connected to the negative output of the two AC/DC constant current units.

5. An intelligent LED drive power according to the claim 1, wherein further includes two light adjusting circuits and a light adjusting signal control input, the light adjusting signal control input is connected to the input of the microcontroller, the output of the microcontroller is connected to the inputs of the two light adjusting circuit, the outputs of the two light adjusting circuits are separately connected to the output of the two AC/DC constant current units.

6. An intelligent LED drive power according to the claim 1, wherein the microcontroller is disposed with a communication interface to connect to the central control computer.

7. An intelligent LED drive power according to the claim 1, wherein the AC/DC constant current unit includes a full-wave rectification unit, a PFC topology unit and an FLYBACK topology unit of in order connected.

8. An intelligent LED drive power according to the claim 1, wherein the AC/DC constant current unit includes a full-wave rectification unit, a PFC topology unit and an LLC topology unit of in order connected.

9. An intelligent LED drive power according to the claim 1, wherein the AC/DC constant current unit includes a full-wave rectification unit, a capacity and a single stage PFC topology unit of in order connected.

10. An intelligent LED drive power according to the claim 2, wherein further includes two light adjusting circuits and a light adjusting signal control input, the light adjusting signal control input is connected to the input of the microcontroller, the output of the microcontroller is connected to the inputs of the two light adjusting circuit, the outputs of the two light adjusting circuits are separately connected to the output of the two AC/DC constant current units.

11. An intelligent LED drive power according to the claim 2, wherein the microcontroller is disposed with a communication interface to connect to the central control computer.

\* \* \* \* \*